United States Patent
Walker et al.

(10) Patent No.: US 9,821,412 B2
(45) Date of Patent: Nov. 21, 2017

(54) REVERSE-ACTING RUPTURE DISC WITH BUCKLING-CONTROL FEATURE

(71) Applicant: Fike Corporation, Blue Springs, MO (US)

(72) Inventors: Joseph Walker, Kansas City, MO (US); Michael Krebill, Lee's Summit, MO (US); Bon Shaw, Blue Springs, MO (US)

(73) Assignee: Fike Corporation, Blue Springs, MO (US)

( * ) Notice: Subject to any disclaimer, the term of this patent is extended or adjusted under 35 U.S.C. 154(b) by 280 days.

(21) Appl. No.: 14/690,047

(22) Filed: Apr. 17, 2015

(65) Prior Publication Data
US 2015/0298902 A1 Oct. 22, 2015

Related U.S. Application Data

(60) Provisional application No. 61/980,730, filed on Apr. 17, 2014.

(51) Int. Cl.
| | |
|---|---|
| *B65D 90/36* | (2006.01) |
| *B23K 26/36* | (2014.01) |
| *F16K 17/16* | (2006.01) |
| *B23K 26/362* | (2014.01) |
| *F16K 17/40* | (2006.01) |

(52) U.S. Cl.
CPC .......... *B23K 26/365* (2013.01); *B23K 26/362* (2013.01); *F16K 17/1606* (2013.01)

(58) Field of Classification Search
CPC .. B23K 26/365; B23K 26/362; F16K 17/1606
USPC ..... 220/89.2, 203.08, 89.1; 137/68.25, 68.27
See application file for complete search history.

(56) References Cited

U.S. PATENT DOCUMENTS

| | | | |
|---|---|---|---|
| 4,122,595 A | 10/1978 | Wood et al. | |
| 4,505,180 A * | 3/1985 | Hinrichs | F02K 9/38 137/68.21 |
| 4,580,691 A * | 4/1986 | Hansen | F16K 17/1613 137/68.21 |
| 4,905,722 A * | 3/1990 | Rooker | B23Q 16/026 137/68.24 |
| 5,267,666 A * | 12/1993 | Hinrichs | F16K 17/162 137/68.21 |

(Continued)

FOREIGN PATENT DOCUMENTS

WO 2014014741 1/2014

OTHER PUBLICATIONS

International Search Report and Written Opinion dated Jul. 15, 2015, in PCT/US15/26484 filed Apr. 17, 2015.

*Primary Examiner* — J. Gregory Pickett
*Assistant Examiner* — Niki M Eloshway
(74) *Attorney, Agent, or Firm* — Hovey Williams LLP (57) ABSTRACT

A reverse-acting pressure relief device (10) is provided comprising buckling-control structures, namely pocket regions (20, 22) and belt regions (24) having differing material thicknesses. The pocket regions (20, 22) generally comprise areas of reduced material thicknesses and serve to weaken the structural integrity of the bulged section (12) of device (10) so that reversal can be initiated at lower pressures. Belt regions (24) generally comprise areas of enhanced mechanical properties that assist with reversal control and opening of bulged section (12) thereby ensuring complete opening of the device (10).

28 Claims, 9 Drawing Sheets

(56) References Cited

U.S. PATENT DOCUMENTS

| | | | | |
|---|---|---|---|---|
| 5,467,886 | A | * | 11/1995 | Hinrichs ............. F16K 17/1606 137/68.26 |
| 6,494,074 | B2 | | 12/2002 | Cullinane et al. |
| 2009/0302035 | A1 | * | 12/2009 | Shaw ........................ B23C 3/34 220/89.2 |
| 2010/0140264 | A1 | | 6/2010 | Hernandez |
| 2010/0224603 | A1 | | 9/2010 | Modena et al. |
| 2014/0021203 | A1 | * | 1/2014 | Walker ................ F16K 17/1606 220/89.2 |
| 2014/0238984 | A1 | * | 8/2014 | Walker ................ B23K 26/364 220/89.2 |
| 2016/0069474 | A1 | * | 3/2016 | Shaw ..................... F16K 17/16 137/68.18 |

* cited by examiner

REVERSE-ACTING RUPTURE DISC WITH BUCKLING-CONTROL FEATURE

RELATED APPLICATION

The Present application claims the benefit of U.S. Provisional Patent Application No. 61/980,730, filed Apr. 17, 2014, which is incorporated by reference herein in its entirety.

BACKGROUND OF THE INVENTION

Field of the Invention

The present invention is generally directed toward reverse-acting rupture discs having buckling-control structures formed therein. The buckling control structures generally comprise one or more belt regions of greater-thickness material, surrounded by pocket regions of lesser-thickness material, in which regions disc material has been removed, preferably via a laser-ablation process. The belt regions, along with other regions of greater thickness, provide zones of enhanced mechanical properties that assist with burst pressure control and reversal and opening performance of the disc upon initiation of bulged section reversal. The domes of such rapture discs are self-supporting, facilitating relatively simple construction.

Description of the Prior Art

Rupture discs have long been utilized to protect pipelines and process equipment from untoward pressure conditions that if left unchecked could result in equipment damage or loss. Rupture discs have been manufactured in a wide range of sizes and pressure ratings. Even rupture discs of a common size, generally indicated by the diameter of the bulged section in the case of reverse-acting discs, can be required to have a range of operational burst pressures to suit the needs of various particular applications. For example, a one-inch reverse-acting rupture disc may require, in some applications, a burst pressure rating of 75 psi. However, in other applications, a one-inch reverse-acting rupture disc may require a burst pressure rating of 50 psi.

Conventional reverse-acting rupture discs exhibit problems with reliable opening in low energy environments, especially those involving contact of the disc with viscous fluids. The opening sequence of a reverse-acting rupture disc begins with the reversal of the concavity of the bulged section and continues with a rupture or tear of the disc material, starting at one or more point(s), which propagates along a predetermined path, often defined by a line of opening. Progress through these stages requires the continual input of energy. Generally, the initial energy input resulting in reversal of concavity is supplied by the process fluid pressurizing the dome of the disc to the point where it becomes mechanically unstable. As the disc begins to reverse, it may continue to receive energy from the fluid. Meanwhile, elastic energy stored in the compressed material of the disc itself may enhance and accelerate disc reversal. The release and transfer of the stored energy within the metal, in turn, may greatly impact the disc's opening performance. This release of stored energy has been called a "snap-through" effect. In order to induce the internal stresses for this snap-through effect to occur, the bulged section of the disc must possess a shape that allows it to deform while storing, and subsequently releasing, the energy transferred to it from the pressure event, without absorbing and dissipating that energy, especially through excessive plastic deformation. As can be expected, in low pressure events, the energy available to initiate and maintain the full disc opening sequence is quite low, which presents a significant challenge to designing reverse-acting rupture discs that open fully under low pressure conditions.

From a manufacturing perspective, achieving lower and lower burst pressures for a given rupture disc size can be challenging. In some instances, lower nominal burst pressures can be achieved through the use of thinner disc materials or by forming the rupture disc from softer materials, such as nickel and silver. Thinner and softer materials are more susceptible to post-manufacturing damage by relatively benign handling, such as might be encountered in packaging and installation of the discs.

In addition, the use of thinner and softer materials can lead to creation of discs having weaker hinge regions; that is, the region of the disc that secures the petal created upon opening of the bulged section to the remaining bulged or flanged section. Weakened hinge regions increase the possibility of undesirable petal fragmentation. Therefore, at some point using thinner and softer materials to achieve lower burst pressures becomes impractical.

Various alternative methods have been proposed for reducing the pressure at which a disc of a certain size and thickness opens. These methods commonly include weakening the structural integrity of the bulged section of the disc. For example, U.S. Pat. No. 6,494,074 discloses a rupture disc assembly having a depression in the convex surface of the disc. The depression is created by deforming the bulged section of the disc using a tool that is forced against the backed-up convex surface of the rupture disc. The shape, area, and depth of the indentation may be selectively varied in order to achieve the desired loss of structural integrity. However, using this method the range of pressures achievable for a given thickness, with good control and predictability of burst pressure is fairly limited. In seeking to achieve lower pressures, the result is that thinner materials are used, with the handling and mechanical-performance problems noted above.

Very low-pressure discs have also been developed as "composite" structures, built up of two or more members to form an effective whole, combining the advantages of thinner and thicker, and/or softer and stiffer materials to achieve requisite performance. For example, a thin non-self-supporting seal membrane may be placed in conjunction with a thicker support membrane provided with through-cuts to provide for opening. These discs are typically complicated to make and difficult to install, in comparison with discs whose structural component is also the sealing component.

SUMMARY OF THE INVENTION

According to one embodiment of the present invention there is provided a reverse-acting overpressure relief device. The relief device, which may be in the form of a rupture disc, comprises a central bulged section having opposed concave and convex faces, and an outer flange section disposed about the periphery of the central bulged section. At least one of the concave and convex faces of the central bulged section comprise at least two pocket regions. The at least two pocket regions are separated by at least one belt region having a material thickness greater than the material thickness of the at least two pocket regions. The belt region includes a waist segment at which initiation of the reversal of the concavity of the central bulged section commences upon exposure of the device to a predetermined overpressure condition. The waist segment is defined at least in part by respective pocket segments of the pocket regions. The waist segment has a width that is less than the combined width of these pocket segments.

According to another embodiment of the present invention there is provided a method of reducing the burst pressure of a reverse-acting overpressure relief device, such as a rupture disc. The method comprises providing a reverse-acting overpressure relief device including a central bulged section and an outer flange section disposed about the periphery of the central bulged section. The central bulged section comprises opposed concave and convex faces. The central bulged section is configured to reverse and open upon exposure of the device to a first overpressure condition. At least two pocket regions are formed in at least one of the concave and convex faces using a laser to remove material therefrom. The at least two pocket regions are separated by at least one belt region having a material thickness greater than the material thickness of the at least two pocket regions. The belt region includes a waist segment at which initiation of the reversal of the concavity of the central bulged section commences upon exposure of the device to a predetermined overpressure condition. The waist segment is defined at least in part by respective pocket segments of the pocket regions. The waist segment has a width that is less than the combined width of these pocket segments. The pressure relief device comprising the at least two pocket regions and the belt region(s) formed in said central section is configured to reverse and open upon exposure of the device to a second overpressure condition that is of a lower magnitude than the first overpressure condition.

DETAILED DESCRIPTION OF THE PREFERRED EMBODIMENT

As noted above, discs of certain minimum material thicknesses possess advantages from a manufacturing and handling standpoint. In order to reap these benefits, the trade off heretofore has been with respect to the range of burst pressures that could be offered for a given disc size and thickness, and particularly, the minimum disc burst pressure. Embodiments of the present invention permit one to take advantage of the preferable manufacturing and handling characteristics of thicker disc materials, while at the same time permitting a broader range of burst pressures to be achieved. Moreover, it is noted that discs or other pressure relief devices described herein can be formed of a single layer of substantially uniform material, as opposed to being multi-element composite or laminated structures made up of a two or more layers of the same or different materials.

Figure 1:
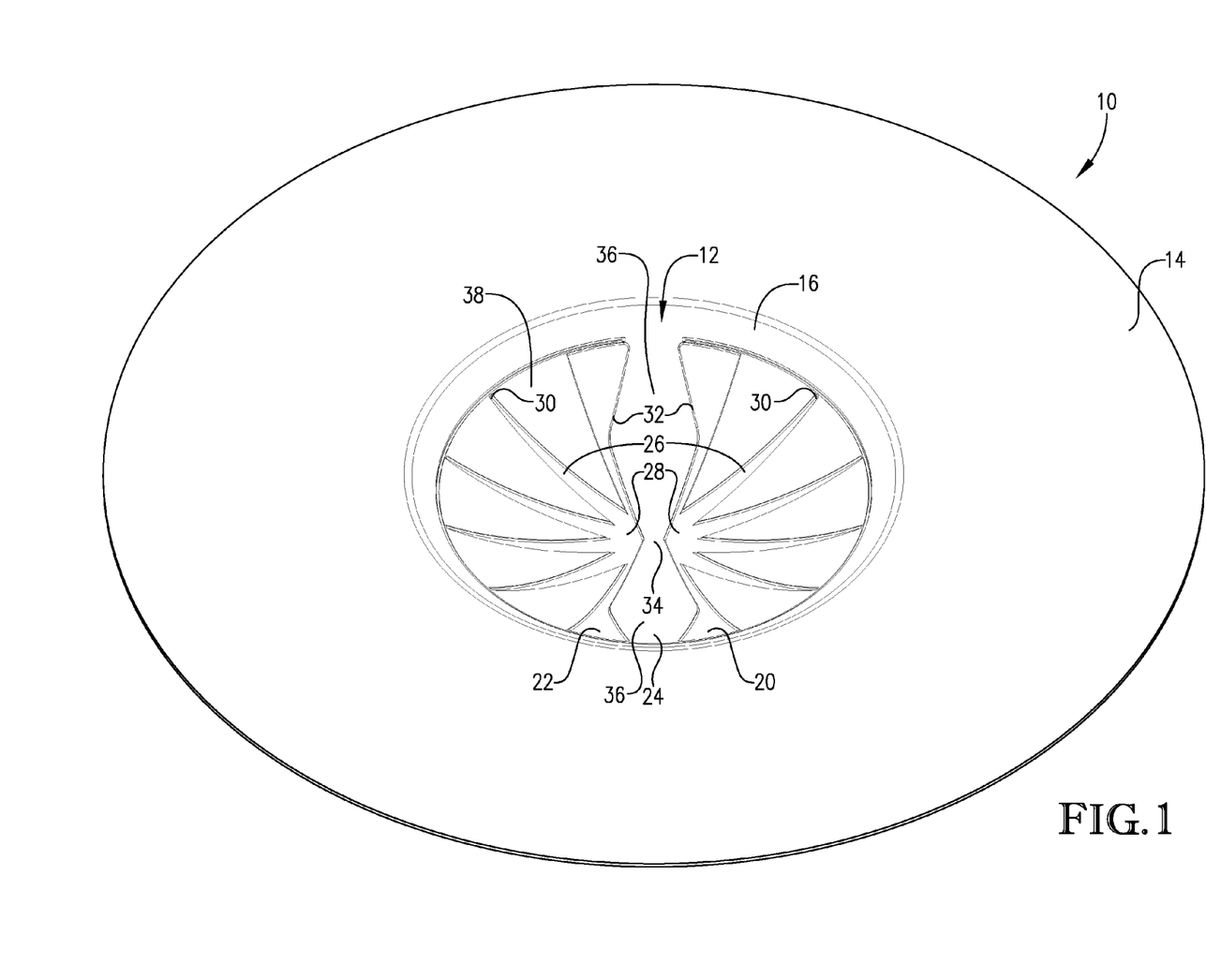
FIG. 1 is a perspective view of a rupture disc having a buckling-control feature according to one embodiment of the present invention.
Figure 4:
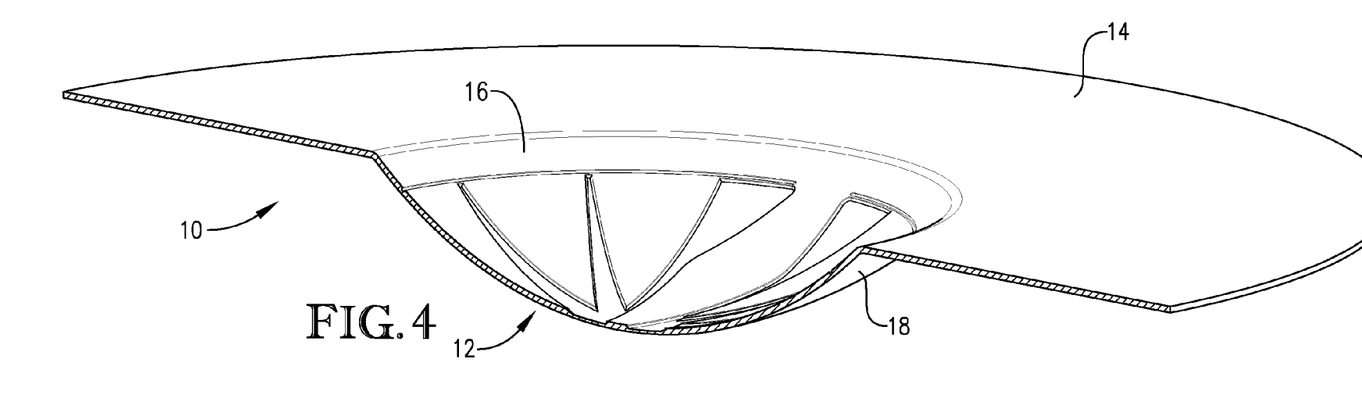
FIG. 4 is a sectioned view of the rupture disc of FIG. 3 taken along line 4-4.
Figure 5:
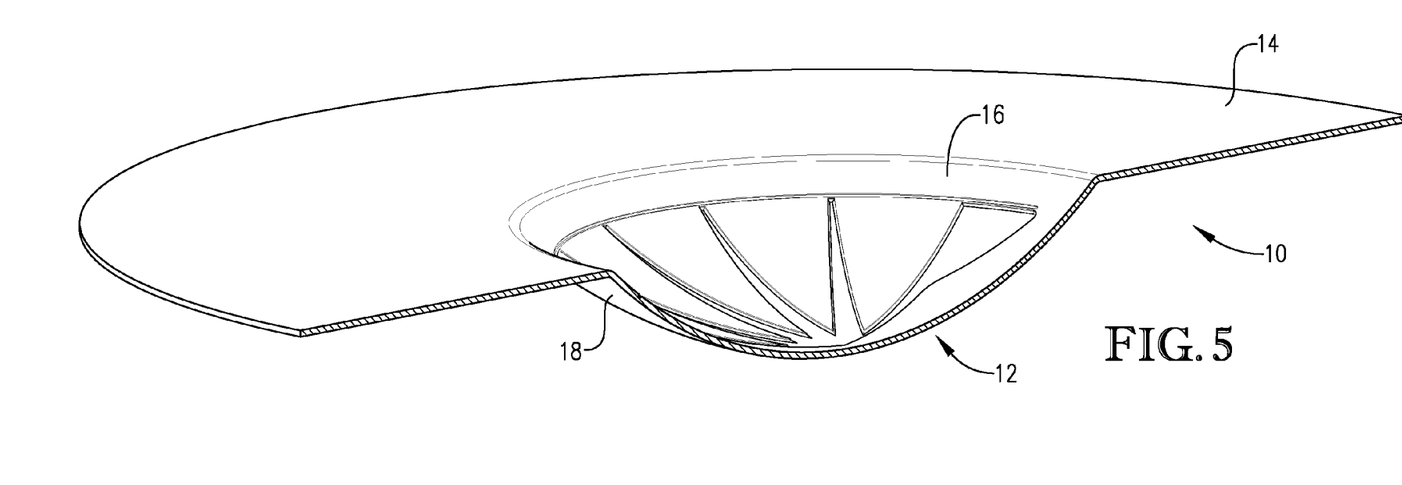
FIG. 5 is a sectioned view of the rupture disc of FIG. 4 taken along line 5-5.

Turning now to FIG. 1, a pressure relief device 10 according to one embodiment of the present invention is illustrated. Particularly, device 10 is a reverse-acting rupture disc having a central bulged section 12 and a relatively flat outer flange section 14 disposed about the periphery of the bulged section. As best shown in FIGS. 4 and 5, bulged section 12 comprises a concave face 16 and a convex face 18. In certain embodiments, pressure relief device 10 is formed from a relatively thin metallic sheet material having an initial material thickness prior to creation of the bulged section of between about 0.001 to about 0.008 inch, between about 0.0015 to about 0.005 inch, or between about 0.002 to about 0.004 inch. In particular embodiments, pressure relief device 10 presents a central bulged section which has a diameter of between about 0.5 to about 2 inches, between about 0.75 to about 1.5 inches, or about 1 inch.

The concave face 16 comprises two pocket regions 20, 22 formed therein. It is within the scope of the present invention for the pocket regions 20, 22 to be formed in the convex face 18 as well. It is also within the scope of the present invention for bulged section 12 to comprise a plurality of pocket regions formed in either or both of the faces 16, 18. The pocket regions 20, 22 comprise areas on a respective face of bulged section 12 that have a reduced average material thickness as compared to the average material thickness of certain areas not included within the pocket regions.

In certain embodiments, pocket regions 20, 22 comprise lased areas in which material has been removed from central bulged section 12 via a laser machining operation. However, it is within the scope of the present invention for alternate means to be employed in order to achieve the relative differences in material thickness between the pocket regions and other areas of bulged section 12 that lie outside of the pocket regions. In particularly preferred embodiments, the laser machining operation is accomplished through the selection of laser operation parameters so that ablation of disc material occurs without altering the metallic grain structure of the disc material remaining behind, such as through the creation of heat affected zones. One of skill in the art is capable of selecting the appropriate laser and laser operating parameters depending upon numerous variables such as the composition of the disc material, disc thickness, and desired processing time. In certain embodiments, a picosecond or femto-second laser having a wavelength in the near ultraviolet to near infrared part of the electromagnetic spectrum is used. In particular embodiments of the present invention, the pocket regions, of which there are at least two, in total occupy greater than 5%, 10%, 15%, 20%, 25%, 30%, 50%, 70%, 80% or 90% of the area of at least one of the concave and convex faces 16, 18.

The bulged section 12 further comprises a belt region 24 located in between and separating pocket regions 20, 22. In certain embodiments, belt region 24 comprises an unlased area in which no material has been removed from bulged section 12. However, it is within the scope of the present invention for belt region 24 to be a lased area itself from which material has been removed, although to a lesser extent than pocket regions 20, 22. Thus, belt region 24 generally presents an average material thickness that is greater than the average thickness of pocket regions 20, 22. These differences in material thicknesses are best shown in FIGS. 4 and 5. It is noted that the material thickness at any given point within a particular region on bulged section 12 generally may vary depending upon its relative position with respect to the apex of the bulged section. Although manufacture of pressure relief device 10 generally commences with a blank of relatively uniform thickness, formation of bulged section 12 can result in the stretching and thinning of material, even though no material has yet been removed. Generally, the disc material is going to be thinnest at the apex and will slightly increase in thickness as flange 14 is approached. Therefore, whenever the material thickness of any particular region or area of device 10 is discussed, the average material thickness across the entire region is generally being referred to so as to account for the variances that result from the bulging operation. Moreover, creation of pocket regions 20, 22 in such a manner so as to avoid the formation of heat affected zones results in the pocket regions having a metallic grain structure that is substantially the same as the metallic grain structure of belt region 24. Thus, the metallic grain structure of bulged section 12 may be substantially uniform and creation of areas of excessive grain deformation and residual stress that could reduce the cycle life of device 10 is avoided.

As noted above, the present invention provides ways of extending the burst pressure range for pressure relief devices of a particular size and material thickness. Particularly, the present invention provides methods of reducing the burst pressure of a reverse-acting overpressure relief device. Using the embodiment of FIG. 1 as an example, a precursor of device 10 is provided which comprises an unlased central bulged section 12 that is configured to reverse and open upon exposure of the device to a first overpressure condition. The various pocket regions 20, 22 are then formed in bulged section 12 according to a laser machining operation as described herein. During the laser machining operation, material making up bulged section 12 is removed through an ablative action resulting in the creation of the pocket regions, which in turn define, at least in part, belt region 24. In certain embodiments, the laser machining operation reduced the average thickness of the device material within pocket regions 20, 22 to less than 90%, less than 75%, less than 50% or less than 35% of the average thickness of belt region 24. In certain embodiments, particularly those in which device 10 is formed from very thin materials, the laser machining operation may result in the formation of witness marks on the face of the disc opposite from that upon which the laser impinged. The resulting device 10 now comprises a central bulged section 12 that is configured to reverse and open upon exposure of the device to a second overpressure condition that is of a lower magnitude than the first overpressure condition.

As an exemplary illustration, consider that device 10 is formed from a metal sheet stock having a thickness of approximately 0.002 in. Circular blanks are cut from this stock and then bulged to provide a precursor to device 10 having a central bulged section diameter of 1 in. The bulged section of this precursor to device 10 will reliably reverse and open (with or without the assistance of an accompanying knife or tooth structure) at 50 psi. However, upon formation of pocket regions 20, 22 and belt region 24 through a laser machining operation resulting in the removal of material from bulged section 12, the bulged section will now reliably reverse and open at a reduced pressure, such as 25 psi. In certain embodiments, it is possible to reduce the burst pressure of a particular rupture disc through methods of the present invention by at least 25%, 40%, 50%, 60%, or 75%.

Pocket regions 20, 22 comprise a plurality of elongate fingers 26 that extend from central pocket segments 28 located adjacent belt region 24 toward flange section 14. The fingers 26 are generally tapered such that their widths decrease as flange section 14 is approached and terminate at end segments 30. Also extending from each central pocket segment 28 is a pair of margin segments 32 that cooperate to define, at least in part, the margins of belt region 24, and in between which fingers 26 extend from central pocket segment 28. Unlike fingers 26, margin segments 32 generally increase in width from central pocket segment 28 toward flange 14.

In certain embodiments, pocket regions 20, 22 are symmetrical about a line of symmetry that extends across belt region 24. Such a line of symmetry is generally indicated by line 5-5 in FIG. 3. The line of symmetry, in this particular embodiment, passes through the apex of bulged section 12. Belt region 24 comprises a narrowed waist segment 34 located at or near the apex of bulged section 12 that is bounded and at least partially defined by central pocket segments 28. In particular embodiments, waist segment 34 has a width that is less than the combined width of the pocket segments 28. The width of waist segment 34 is determined as the narrowest distance between pocket segments 28. The width of pocket segments 28 is determined normal to waist segment 34 and co-linear with the waist segment width measurement. In other embodiments, the width of waist segment 34 is less than 100%, less than 75%, less than 50%, less than 25%, or less than 10% of the width of at least one of pocket segments 28.

Figure 3:
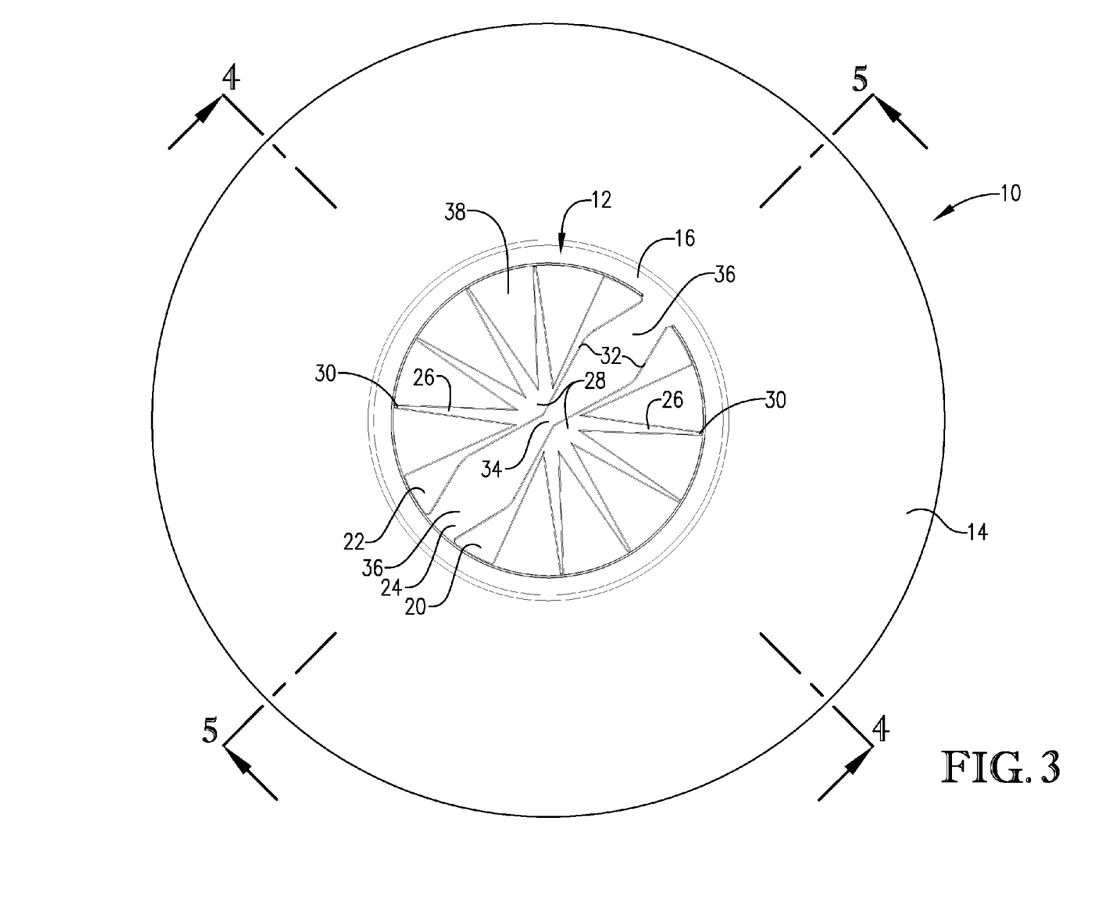
FIG. 3 is a plan view of the rupture disc of FIG. 1 showing the concave face thereof.

Belt region 24 further comprises a pair of widened segments 36 disposed laterally from waist segment 34. Widened segments 36 are defined, at least in part by portions of margin segments 32. In certain embodiments the ratio between waist segment 34 and widened segments 36 is between about 1:10 to about 1:1.25, or between about 1:5 to about 1:1.5, or between about 1:3 to about 1:2. The presence of waist segment 34 at or near the apex provides for a weakened area on bulged section 12 where initiation of disc reversal may commence upon exposure of bulged section 12 to a predetermined overpressure condition. However, widened segments 36 provide for enhanced mechanical properties of belt region 24 to ensure sufficient "snap-through" of bulged section 12 during the disc reversal and opening process. A plurality of intermediate segments 38 disposed in between adjacent fingers 36, and in between fingers 36 and margin segments 32 also provide structural integrity to bulged section 12. Intermediate segments 38 generally comprise areas of increased material thickness as compared with fingers 36 that may be lased or unlased. Upon reversal of bulged section 12, intermediate segments 38 assist with directing and concentrating disc-opening energy toward end segments 30 thereby ensuring the creation of as large of a disc opening area as possible.

Figure 2:
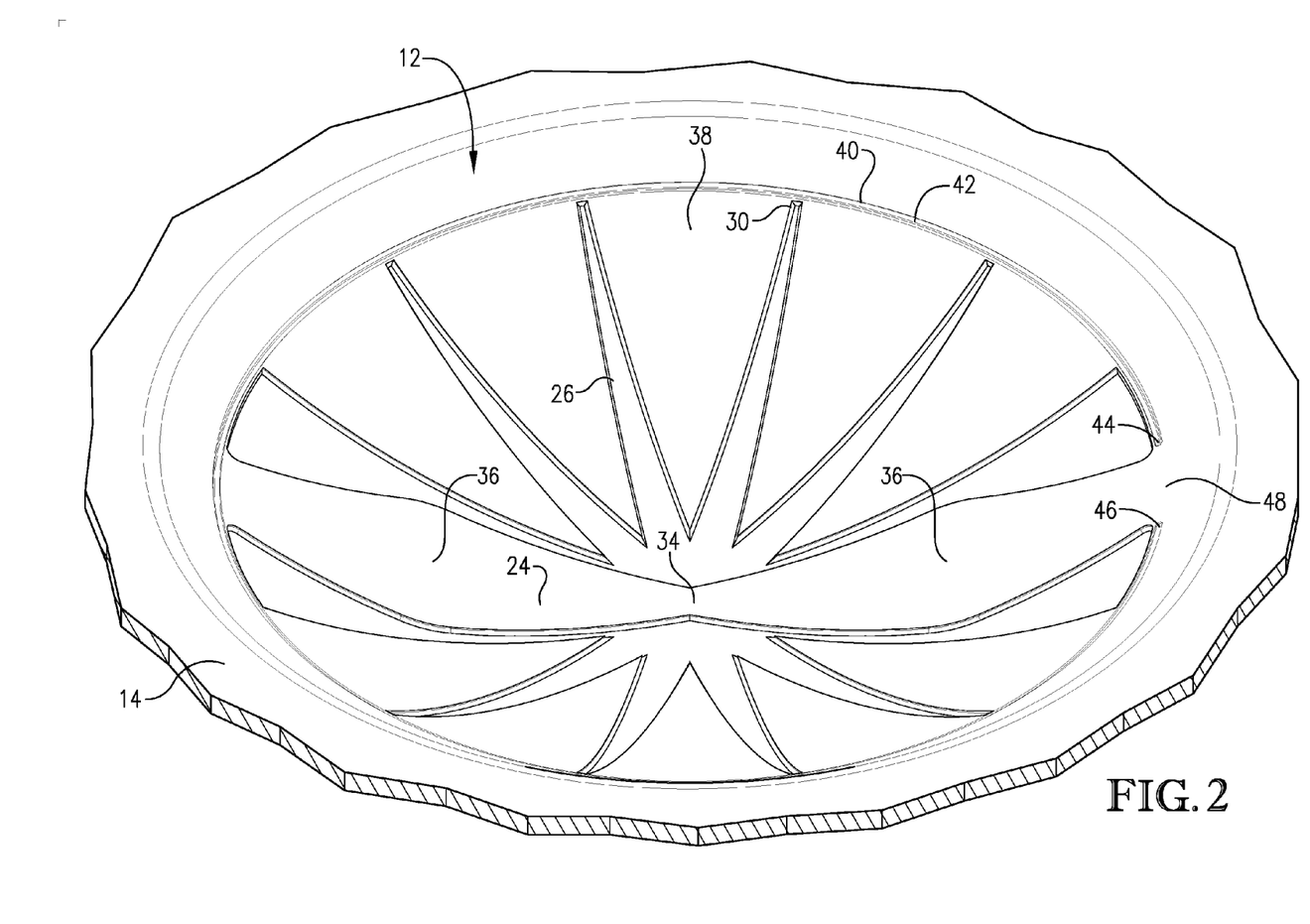
FIG. 2 is a close-up view of the concave face of rupture disc of FIG. 1 in which the buckling-control feature has been created.

As best shown in FIG. 2, a line of opening 40 comprising a line-of-opening recess 42 is formed in bulged section 12 to further assist with disc opening. However, it should be understood that line of opening 40 need not be present in all embodiments according to the present invention and can be omitted if deemed unnecessary to achieving full opening of the disc. Line of opening 40 is C-shaped in configuration and comprises a pair of opposed ends 44, 46, which define a hinge region 48 therebetween. Belt region 24 intersects and is unitary with hinge region 48.

In the embodiment illustrated in FIG. 2, each of fingers 26 terminates in end segment 30 located adjacent to line of opening 40. In certain embodiments, end segments 30 do not intersect with the line-of-opening recess 42. This is to ensure that during lasing of concave face 16 the laser does not make more passes over any single point on bulged section 12 than what is desired. However, in certain embodiments, end segments 30 may intersect with line-of-opening recess 42 such that no unlased area separates the two structures. During opening of device 10, a petal is formed by tearing of bulged section 12 along the line of opening. The petal then pivots about hinge region 48 to complete opening of the device.

Figure 6:
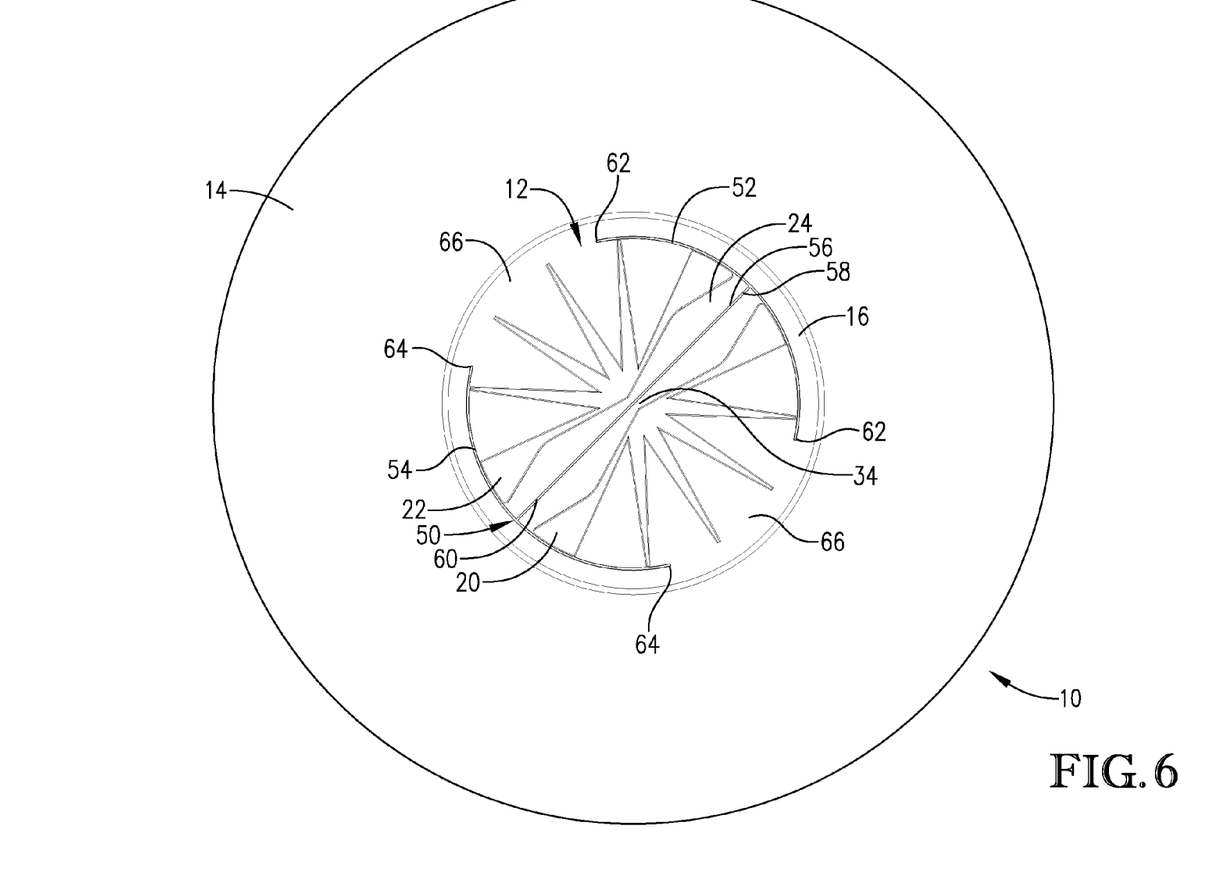
FIG. 6 is a plan view of a rupture disc according to an embodiment of the present invention in which two petals are formed from the bulged section upon opening of the disc.

FIG. 6 illustrates device 10 having a different line of opening configuration, one configured to result in the formation of multiple petals upon opening of bulged section 12. Device 10 is essentially identical to the embodiment depicted in FIGS. 1-5, with the exception of the location and configuration of the line of opening. A line of opening 50 is formed in concave face 16 and comprises two arcuate channels 52, 54 located outboard of pocket regions 20, 22 and a transverse channel 56 that extends therebetween. In certain embodiments, channel 56 can be continuous with arcuate channels 52, 54, although, as noted above, care should be taken to avoid unintentional overlap of laser beam passes at the points of intersection between the channels to prevent removal of more disc material than desired. In other embodiments, this risk can be eliminated by configuring line of opening 50 so that the radial ends 58, 60 of channel 56 are spaced from channels 52, 54 by a small area of lased or unlased material having greater thickness than that of either adjacent channel.

Transverse channel 56 extends along belt region 24, and in certain embodiments, overlies the apex of bulged section 12. In certain embodiments, channel 56 bisects belt region 24 and may act as a line of symmetry with respect to pocket regions 20 and 22. Channels 52, 54 include spaced-apart ends 62, 64, respectively, that define hinge regions 66 therebetween. Upon reversal of bulged section 12 in response to an untoward pressure condition, bulged section 12 tears along line of opening 50 thereby forming two petals, each of which pivots about a respective hinge region 66 during opening of device 10.

Device 10 can be configured with other line of opening configurations that result in the creation of multiple petals upon opening. For example, the line of opening may be in the form of two or more intersecting lines resulting in the formation of three, four, five or six petals upon opening, each of which pivots about its own respective hinge region. It is also within the scope of the present invention for the line of opening to avoid direct overlap or intersection with any pocket region formed in a respective convex or concave face of the bulged section. Thus, in such embodiments, each resulting petal may comprise its own respective pocket region, or no pocket region at all. In other embodiments, the line of opening may cross or intersect a pocket region. In such embodiments, the channel segment of the line of opening that overlies the pocket region may have a reduced thickness compared to the thickness of the pocket region.

FIGS. 7-14 illustrate additional embodiments according to the present invention. Generally, these embodiments share numerous features with the embodiments of FIGS. 1-6 described above, such as the presence of at least one belt region and at least two pocket regions. For ease of description, all structures illustrated are assumed to be formed in a concave face of a bulged section of a pressure relief device; however, it is understood that the structures may be formed in a convex face if so desired. Moreover, the description of these embodiments is largely directed toward features of the respective embodiments that are unique from the embodiments of FIGS. 1-6. With respect to features of FIGS. 7-14 that are common with the embodiments of FIGS. 1-6, the above descriptions of those features may be applied to the embodiments of FIGS. 7-14.

Figure 7:
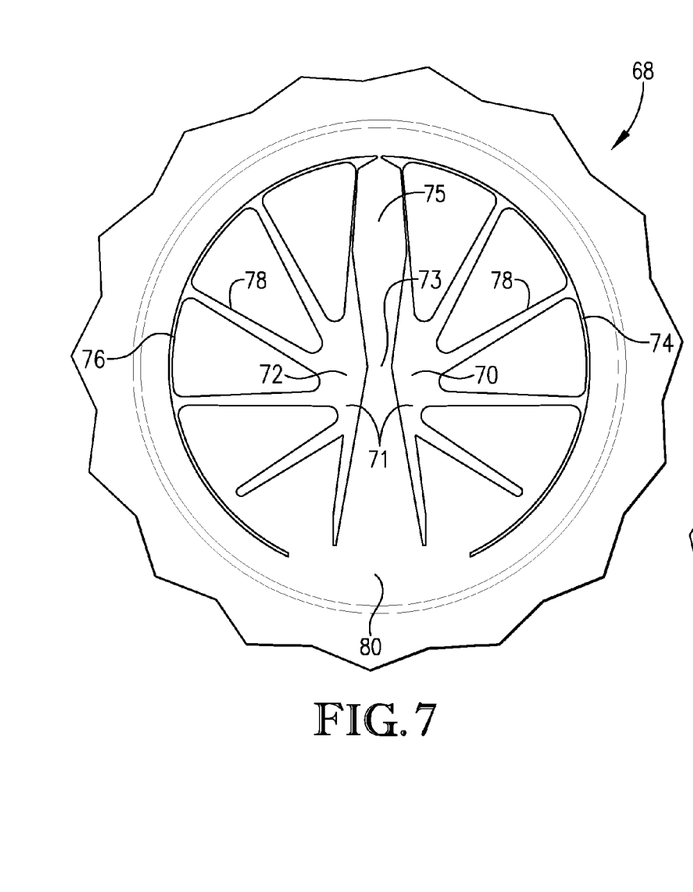
FIGS. 7-12 are fragmented plan views of rupture discs having a buckling-control feature according to alternate embodiments of the present invention.

Turning to FIG. 7, a single-petal, reverse-acting pressure relief device 68 is illustrated. Device 68 is shown without a separate line of opening. Rather, each pocket region 70, 72 includes a circumscribing segment 74, 76, respectively, that is unitary with each pocket. Each pocket region includes a plurality of radially extending fingers 78, some of which intersect with segments 74, 76. Upon reversal of the bulged section of device 68, the device opens along segments 74, 76 and pivots about a hinge region 80. Pocket regions 70, 72 each comprise pocket segments 71 that define, at least in part, a waist segment 73 of a belt region 75.

Figure 8:
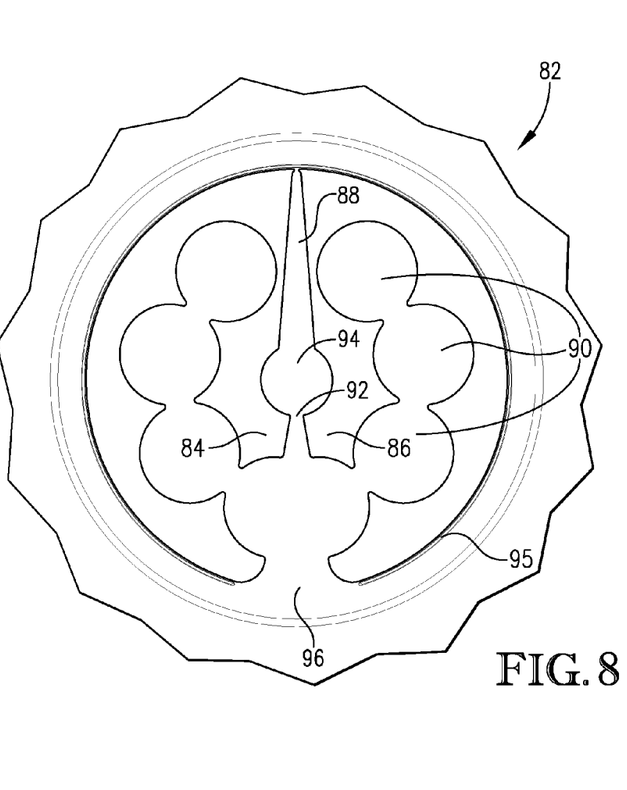

FIG. 8 also depicts a single-petal, reverse-acting pressure relief device 82 having pocket regions 84, 86 formed therein that define a belt region 88 therebetween. Pocket regions 84, 86 generally surround a plurality of unlased zones 90 that are of a circular shape. Zones 90 are continuous with each other and provide areas of enhanced rigidity for the bulged section of device 82. Belt region 88 comprises a centrally disposed waist segment 92 that is located adjacent, but does not overlie, the apex of the bulged section. Moreover, save for a circularly-shaped area 94 that overlies and may be concentric with the apex of the bulged section and waist segment 92, belt region generally comprises a tapered configuration that is widest nearest hinge region 96 and narrows in a direction moving away from the hinge region. Device 82 also includes a C-shaped line of opening 95, whose ends help to define hinge region 96.

Figure 9:
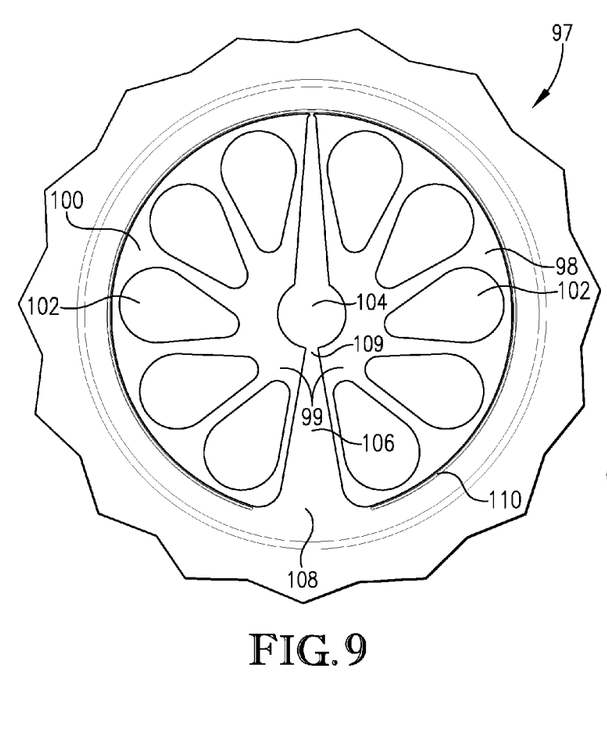
Figure 10:
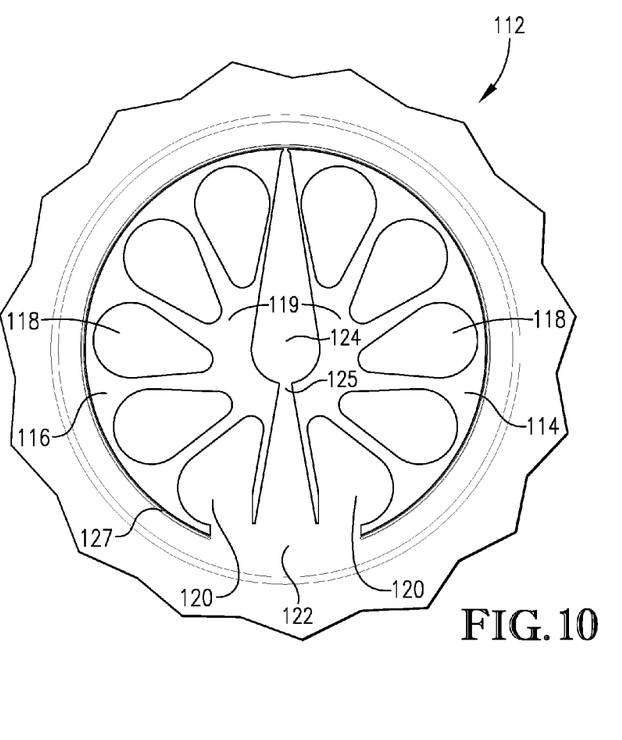

FIGS. 9 and 10 depict alternate embodiments according to the present invention. These embodiments are very similar to one another, with a few variances in the configurations of the pocket and belt regions. Turning first to FIG. 9, the pressure relief device 97 comprises pocket regions 98, 100, including pocket segments 99. Contained within each pocket region is a plurality of unlased areas or islands 102. The islands 102 are pear-shaped with the narrower portion pointing toward the center of the bulged section and the wider portion disposed toward the outer flange section of the device. A belt region 104 is configured similarly to belt region 88 of the embodiment shown in FIG. 8; however, the margins of pocket regions 98, 100 provide for a well-defined segment 106 that extends toward hinge region 108. In addition, pocket segments 99 define, at least in part, a waist segment 109. A C-shaped line of opening 110 is also provided and helps to define hinge region 108.

The embodiment depicted in FIG. 10, as noted above, shares many similarities with the embodiment of FIG. 9. FIG. 10 illustrates a pressure relief device 112 comprising pocket regions 114, 116, each containing a plurality of islands 118. Pocket regions 114, 116 also comprise central pocket segments 119. However, the islands 120 that are located closest to hinge region 122 are not fully surrounded by their respective pocket regions. Rather, islands 120 comprise unlased areas that are contiguous with hinge region 122. Belt region 124 also comprises a "carrot-like" shape having a waist segment 125 that is defined, at least in part, by pocket segments 119. Device 112 is also shown as having a C-shaped line of opening 127 whose ends help define hinge region 122.

Figure 11:
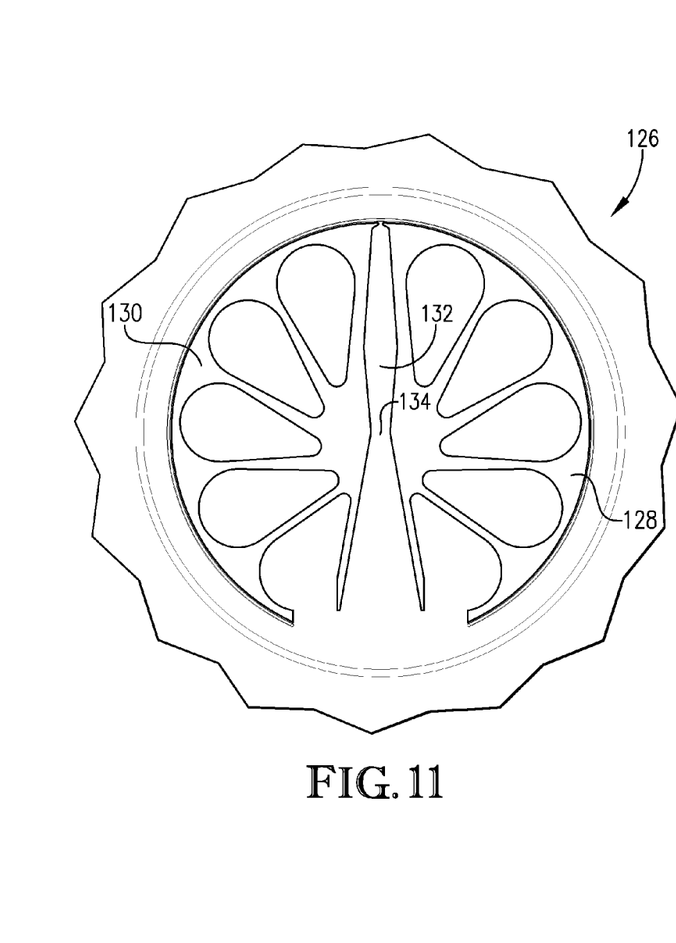
Figure 12:
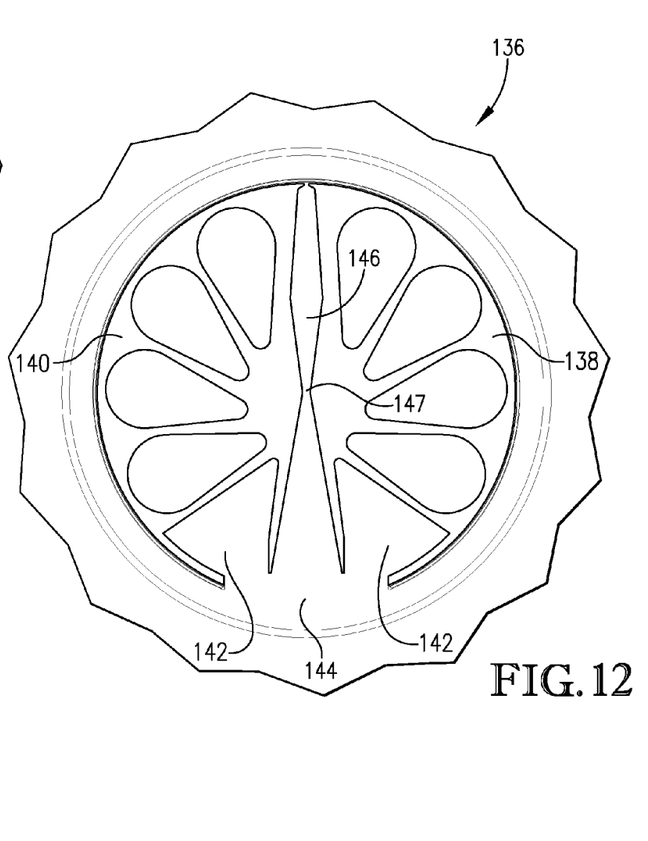

The embodiments of FIGS. 11 and 12 further build off of the embodiment depicted in FIG. 10. In FIG. 11, a pressure relief device 126 comprises pocket regions 128, 130 formed in its central bulged section. These pocket regions are nearly identical to pocket regions 114, 116 of the embodiment shown in FIG. 10, with the exception that the margins defining the belt region 132 have been modified so that the belt region more closely resembles the belt region 24 of the embodiments of FIGS. 1-6. In particular, the narrowed waist segment 134 of belt region 132 has been located at or nearer to the apex of the bulged section than waist segment 92 of the embodiment shown in FIG. 8.

The embodiment of FIG. 12 is, again, very similar to the embodiment shown in FIG. 11. The pressure relief device 136 comprises pocket regions 138, 140 formed in its central bulged section. These pocket regions are nearly identical to the pocket regions 128, 130 of the embodiment shown in FIG. 11, except that the margins of the pocket regions have been modified so as to produce wedge-shaped open island structures 142 proximate the hinge region 144. The belt region 146 is also very similar in configuration to belt region 132 as illustrated in FIG. 11, except that its width has been generally narrowed along substantially its entire length, including a narrower waist segment 147.

Figure 13:
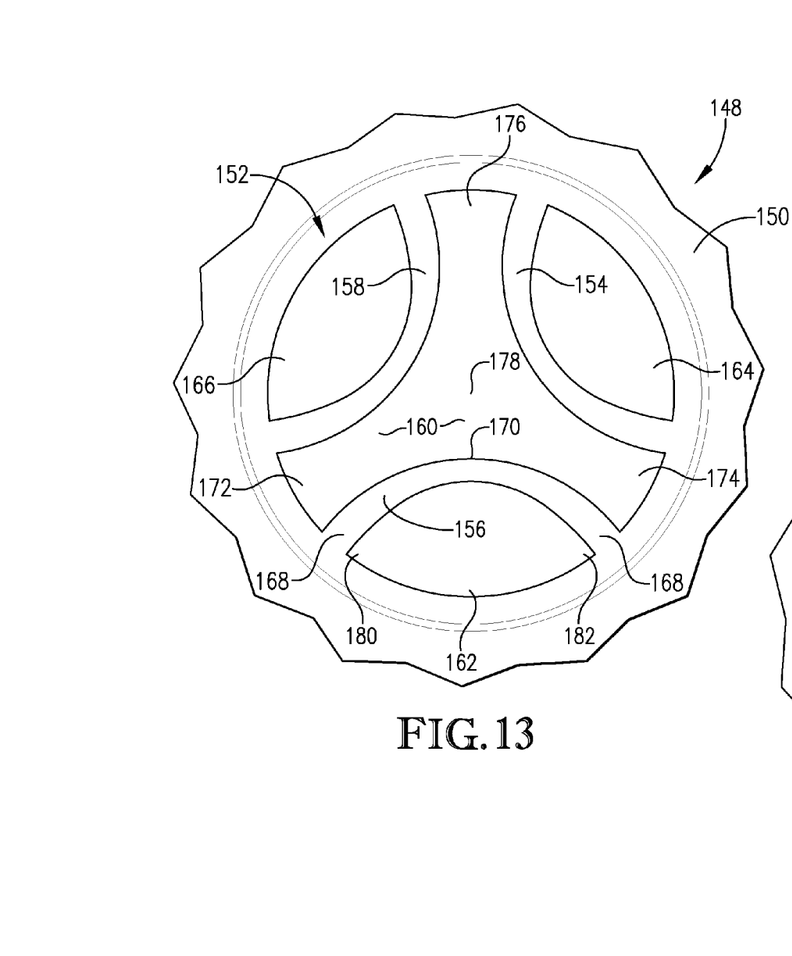
FIGS. 13 and 14 are fragmented plan views of rupture discs having a buckling-control feature comprising a plurality of belt-segments extending across the concave face of the bulged section of the disc.
Figure 14:
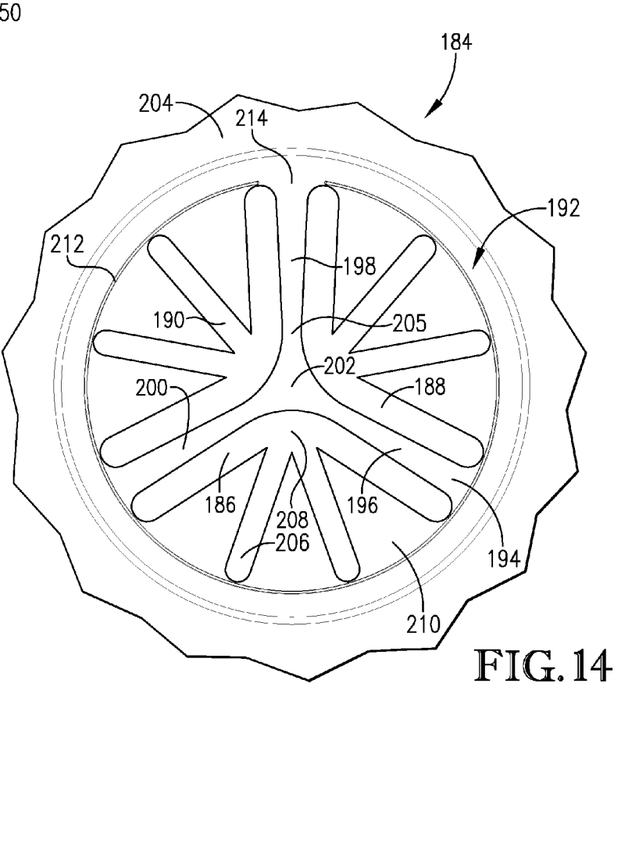

FIGS. 13 and 14 illustrate further pressure relief device embodiments in accordance with the present invention having different pocket and belt region configurations than the embodiments discussed above. FIG. 13 depicts a reverse-acting pressure relief device 148 comprising an outer flange section 150 and a central bulged section 152. Formed in a face, e.g., the concave face, of bulged section 152 are three arcuate belt regions 154, 156, 158 and a plurality of pocket regions 160, 162, 164, 166. It is understood that these belt and pocket regions may be arranged in other ways without departing from the scope of the present invention. For example, the bulged section may comprise a single, arcuate (in plan view) belt region, or it may comprise at two or more arcuately-shaped belt regions. Likewise, the bulged section may comprise any number of pocket regions. However, in certain embodiments, each belt region is defined, at least in part, by the margins of two adjacent pocket regions. Further, like the embodiments described above, the pocket regions generally comprise areas of the pressure relief device that have an average material thickness that is less than the average material thickness of the belt regions.

Each of belt regions 154, 156, 158 comprise a pair of spaced apart end segments 168 interconnected by a central bight section 170 that extends toward the apex of the central bulged section 152. In certain embodiments, bight section 170 is similar in configuration to the above-described waist segments as it also represents a narrowed segment of a respective belt region and defines a point at which the initiation of reversal of the bulged section commences. Belt regions 154, 156, 158 comprise areas of enhanced mechanical properties within bulged section 152 that provide for the "snap through" effect upon opening of the bulged section. Pocket region 160 comprises the largest pocket region in terms of area and includes three arm segments 172, 174, 176 that radially extend from a central segment 178, which extends across and covers the apex of bulged section 152. Pocket regions 162, 164, 168 are disposed generally outboard of respective belt regions and have individual areas less than that of central pocket region 160. As illustrated, pocket regions 162, 164, 166 are of oblong shape, terminating in marginal regions 180, 182 adjacent end segments 168.

Although bulged section 152 is not shown as being equipped with a line of opening, it is within the scope of the present invention for any number of line of opening configurations, such as those described previously, to be added thereto as deemed appropriate to achieve certain opening characteristics. Such lines of opening may be confined to unlased areas of bulged section 152, or may extend, in whole or in part, across the various pocket regions.

FIG. 14 illustrates yet another embodiment according to the present invention in which a pressure relief device 184 comprises a plurality of discrete pocket regions 186, 188, 190 formed in a central bulged section 192 of the device. The pocket regions are separated from each other by a belt region 194 comprising belt segments 196, 198, 200 extending from a central belt zone 202 located at or near the apex of bulged section 192. Each of the belt segments separate one of the pocket regions from another of the pocket regions and diverge from central belt zone 202 toward the outer flange section 204. Each of belt segments 196, 198, 200 comprise a waist segment 205 that represents a narrowed portion of the belt segment and, in certain embodiments, defines a point at which the initiation of reversal of the bulged section commences.

Pocket regions 186, 188, 190 share certain common features with pocket regions 20, 22 from FIG. 1. For example, each of pocket regions 186, 188, 190 comprise a plurality of fingers 206 extending from a central pocket segment 208 outwardly toward flange section 204. Fingers 206 are also separated from each other by unlased intermediate segments 210. Central pocket segments 208 also serve to define, at least in part, waist segments 205.

Device 184 is also shown equipped with a C-shaped line of opening 212, the ends of which define a hinge region 214 that is generally aligned with belt segment 198. It is within the scope of the present invention for device 184 to comprise alternate line of opening configurations. For example, device 184 could readily be modified to give a tri-petal configuration by placement of a line of opening comprising three segments, each extending across a respective belt segment. Respective hinge regions could then be defined between fingers 206 of a respective pocket region.

The foregoing description of embodiments according to the present invention has been exemplary in nature and is not intended to be a limitation upon the overall scope of the invention. It can readily be appreciated that features from various embodiments can be combined or adapted to function with features of other embodiments. Moreover, the various pocket and belt regions depicted may also be modified in order to impart desirable reversal and opening characteristics.

We claim:

1. A reverse-acting overpressure relief device comprising:
   a central bulged section having opposed concave and convex faces; and
   an outer flange section disposed about the periphery of said central bulged section,
   at least one of said concave and convex faces of said central bulged section comprising at least two pocket regions,
   said at least two pocket regions being separated by a belt region having a material thickness greater than the material thickness of said at least two pocket regions, each pocket region comprising a respective pocket segment,
   said belt region including a waist segment at which initiation of the reversal of the concavity of said central bulged section commences upon exposure of said device to a predetermined overpressure condition, said waist segment being defined at least in part by at least a pair of said pocket segments, said waist segment having a width that is less than the combined width of said pocket segments.

2. The device according claim 1, wherein said at least two pocket regions comprise lased areas in which material has been removed from said central bulged section.

3. The device according to claim 2, wherein said at least two pocket regions comprise a metallic grain structure that is substantially the same as the metallic grain structure of said belt region.

4. The device according to claim 1, wherein each of said at least two pocket regions comprise one or more elongate fingers that extend from said pocket segments toward said outer flange section.

5. The device according to claim 4, wherein at least one of said fingers decreases in width as said outer flange section is approached.

6. The device according to claim 4, wherein at least one of each of said fingers terminates adjacent to a line of opening formed in said bulged section.

7. The device according to claim 1, wherein said at least two pocket regions are symmetrical about a line of symmetry that extends across said belt region.

8. The device according to claim 1, wherein said waist segment is located at or near an apex of said central bulged section.

9. The device according to claim 8, wherein said at least two pocket regions combined occupy at least 5% of the area of said at least one face.

10. The device according to claim 1, wherein each of said at least two pocket regions comprise two or more elongate fingers that extend from said pocket segment toward said outer flange section.

11. The device according to claim 1, wherein said belt region comprises an area in which no material has been removed from said central bulged section.

12. The device according to claim 1, wherein said central bulged section comprises a C-shaped line of opening formed therein, said line of opening comprising opposed ends that define a hinge region therebetween and about which a petal formed by tearing of said central bulged section along said line of opening pivots during opening of said device.

13. The device according to claim 12, wherein said belt region intersects said hinge region.

14. The device according to claim 1, wherein said central bulged section comprises a line of opening, at least a portion of which extends along said belt region and is configured to define at least two hinge regions about which at least two respective petals formed by tearing of said central bulged section along said line of opening pivot during opening of said device.

15. The device according to claim 14, wherein said line of opening bisects said belt region.

16. The device according to claim 1, wherein said central bulged section comprises at least three pocket regions.

17. The device according to claim 16, wherein said belt region comprises at least three belt segments, each of which separate one of said pocket regions from one other of said pocket regions.

18. The device according to claim 17, wherein said belt segments diverge from a central belt zone located at or near an apex of said central bulged section toward said outer flange section.

19. The device according to claim 16, wherein one of said pocket regions overlies an apex of said central bulged section.

20. The device according to claim 19, wherein said central bulged section comprises at least two arcuately-shaped belt regions.

21. The device according to claim 20, wherein each of said arcuately-shaped belt regions comprises a pair of spaced apart end segments interconnected by a central bight section that extends toward the apex of said central bulged section.

22. The device according to claim 1, wherein said waist segment comprises a narrowed portion of said belt segment.

23. A method of reducing the burst pressure of a reverse-acting overpressure relief device comprising:
providing a reverse-acting overpressure relief device comprising a central bulged section and an outer flange section disposed about the periphery of said central bulged section, said central bulged section comprising opposed concave and convex faces, said central bulged section configured to reverse and open upon exposure of said device to a first overpressure condition; and
forming at least two pocket regions in at least one of said concave and convex faces using a laser to remove material therefrom, each of said pocket regions comprising a respective pocket segment, said at least two pocket regions being separated by a belt region having a material thickness greater than the material thickness of the at least two pocket regions, said belt region including a waist segment at which initiation of the reversal of the concavity of said central bulged section commences upon exposure of said device to a predetermined overpressure condition, said waist segment being defined at least in part by a least a pair of said pocket segments, said waist segment having a width that is less than the combined width of said pocket segments
wherein said pressure relief device comprising said at least two pocket regions and said belt region formed in said central section is configured to reverse and open upon exposure of said device to a second overpressure condition that is of a lower magnitude than said first overpressure condition.

24. The method according to claim 23, wherein said method further comprises forming a line-of-opening recess in said central bulged section using said laser.

25. The method according to claim 23, wherein said step of forming said at least two pocket regions comprises reducing the average thickness of the device material within said pocket regions to less than 90% of the average thickness of said belt region.

26. The method according to claim 23, wherein said step of forming said at least two pocket regions does not result in the formation of heat-affected zones within the device material.

27. The method according to claim 23, wherein at least two pocket regions are formed in the concave face of said central bulged section.

28. The method according to claim 23, wherein said step of forming said at least two pocket regions results in the formation of witness marks on the opposed, unlased face of said central bulged section.

* * * * *